(No Model.) 2 Sheets—Sheet 2.
F. W. HUENNEKENS.
BICYCLE.
No. 498,394. Patented May 30, 1893.
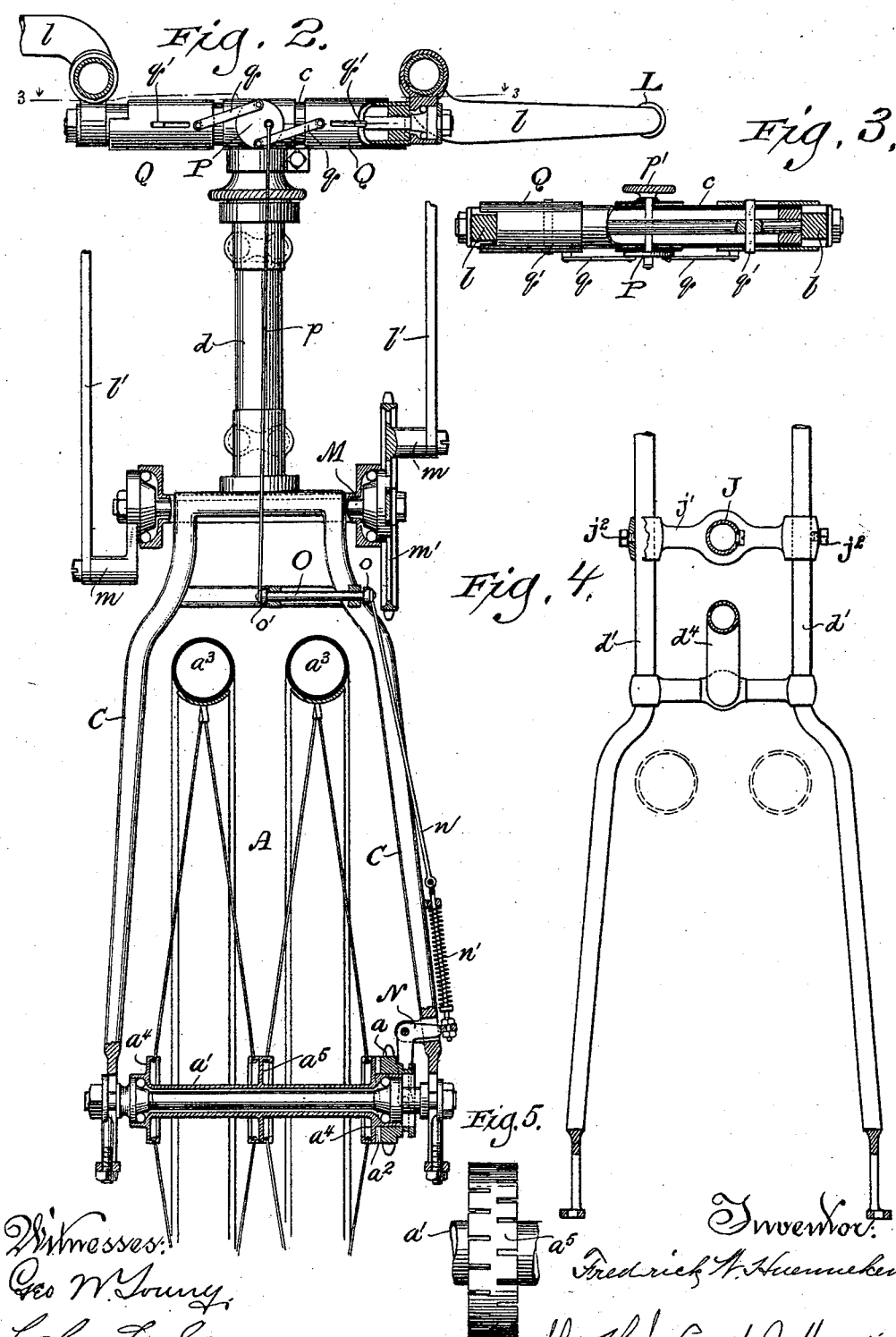

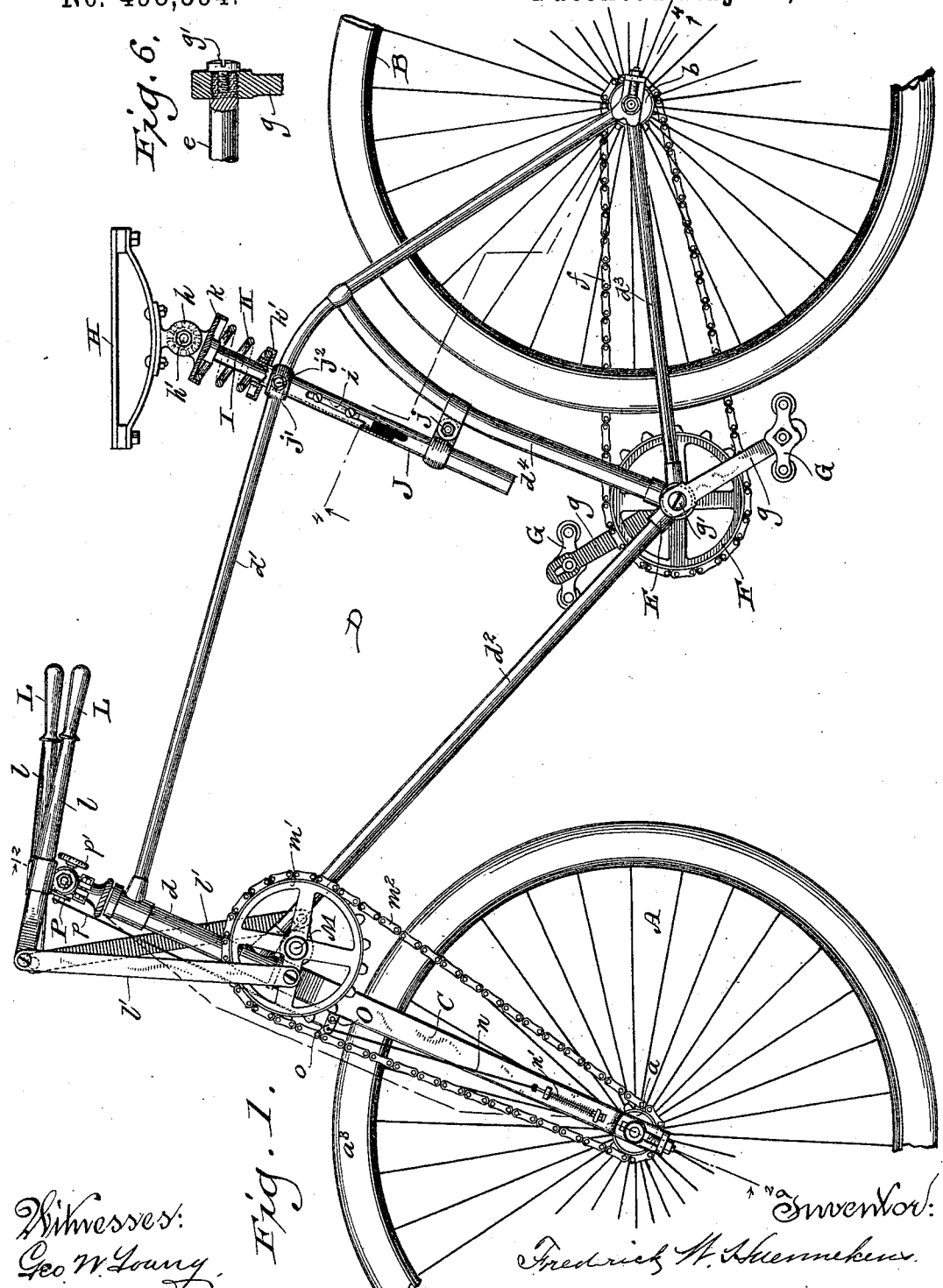

UNITED STATES PATENT OFFICE.

FREDRICK W. HUENNEKENS, OF MILWAUKEE, WISCONSIN.

BICYCLE.

SPECIFICATION forming part of Letters Patent No. 498,394, dated May 30, 1893.

Application filed January 16, 1893. Serial No. 458,600. (No model.)

*To all whom it may concern:*

Be it known that I, FREDRICK W. HUENNEKENS, of Milwaukee, in the county of Milwaukee and State of Wisconsin, have invented certain new and useful Improvements in Bicycles; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main objects of my invention are to afford exercise for the arms as well as for the legs; to simplify and facilitate the adjustment of the saddle and generally to improve the construction of machines of this class.

It consists essentially of independently movable propelling and steering handles, driving connections between them and the front wheel, means for disconnecting the driving connections from the front wheel and locking said handles rigidly in place for steering only, of a novel adjustable saddle support, and of certain novel details of construction, hereinafter particularly described and pointed out in the claims.

In the accompanying drawings like letters designate the same parts in the several views.

Figure 1 is a side elevation of a bicycle embodying my improvements. Fig. 2 is a front elevation on an enlarged scale of the front wheel fork and steering handles, showing certain parts in cross section on the line 2 2, Fig. 1. Fig. 3 is a partial plan view and horizontal section on the line 3 3, Fig. 2, of the cross bar at the upper end of the wheel fork spindle, showing the locking device for holding the steering handles rigidly in place when not employed in propelling the front wheel. Fig. 4 is a partial inverted plan view and section on the line 4 4, Fig. 1, viewed in the direction indicated by the arrows in connection with the line 4 4. Fig. 5 is a detail view on an enlarged scale of the center wheel-hub flange, and Fig. 6 is a detail view of the fastening device for securing the pedal cranks upon the crank axle.

A represents the front wheel; B the rear wheel; C the front wheel fork, which is formed with a spindle held and capable of turning in a sleeve $d$ constituting a part of the frame, which comprises tubular saddle bars $d'$ extending rearwardly from the sleeve $d$ to the rear axle bearings, tubular braces $d^2$ and $d^3$ connecting the crank axle hanger E with the rear axle bearings and with the sleeve $d$, and a tubular upright $d^4$ connecting the hanger E with the saddle bars $d'$.

F is a sprocket wheel fixed on the crank axle $e$ and connected by a chain belt $f$ with a sprocket wheel $b$ on the rear wheel axle in the usual manner, as shown in Fig. 1.

G G are the pedals, and $g\ g$ the pedal cranks secured upon opposite ends of the axle $e$, as shown in detail in Fig. 6. The hubs of the pedal cranks $g\ g$ are formed with screw threaded holes and are screwed upon the correspondingly threaded ends of the axle $e$, the threads being of such direction that the force applied to the cranks $g\ g$ in their forward movement will tend to tighten them upon the axle $e$. The cranks are secured upon said axle by screws $g'$ threaded into the ends of said axle, having broad heads which project over the hubs of said cranks, the threads of said screws being formed in the reverse direction to those on corresponding ends of axle $e$.

H represents the saddle provided with a perforated clutch plate $h$, which is secured by a bolt $h'$ to a corresponding clutch plate formed upon or attached to the upper end of spindle I. By means of this pivoted clutch connection between the saddle H and spindle I, the saddle may be tilted forward or backward as desired.

J is a tubular saddle support having at or near its lower end a pivotal connection $j$ with the upright $d^4$ of the frame and adjustably connected at its upper end by a cross bar $j'$ with the saddle bars $d'\ d'$, which have a curve just in front of their connection with the upright $d^4$ concentric with the pivot connection $j$ so as to permit of the forward and backward adjustment of the tubular saddle support J. The cross bar $j'$ is secured in place upon the saddle bars $d'\ d'$ by set screws $j^2\ j^2$, as shown in Figs. 1 and 4.

K is a telescoping spiral spring interposed between flanged bearing plates $k$ and $k'$ attached respectively to the upper end of spindle I and the upper end of the tubular support J in which said spindle is inserted and freely movable lengthwise, being held from turning by a key or spline $i$. The tubular support J is made adjustable vertically through the cross bar $j'$, and its pivot connection $j$ is vertically adjustable upon the upright $d^4$, thus affording means for readily raising or lowering the saddle H.

L L are the handles, and $l\,l$ the handle bars, which are pivotally mounted upon the ends of a tubular cross bar $c$ fixed to the upper end of the front fork spindle and connected at their forwardly projecting ends by rods $l'\,l'$ with oppositely set cranks $m\,m$ on the ends of a cross shaft M carried by the front fork C above the front wheel A, as shown in Figs. 1 and 2. Upon the shaft M is mounted a sprocket wheel $m'$, which is connected by a chain belt $m^2$ with a sprocket wheel $a$ loosely mounted upon the end of the hub $a'$ of the front wheel and provided with clutch formations $a^2$ adapted to engage with corresponding formations on said wheel hub.

N is a forked bell crank lever engaging with its forked arms a groove in the hub of sprocket wheel $a$ and fulcrumed to the adjacent arm of the fork C, as shown in Fig. 2.

O is a horizontal rock shaft carried by the fork C above the front wheel and provided with crank arms $o$ and $o'$. The crank arm $o$ is connected by a jointed rod $n$ with the outwardly projecting horizontal arm of lever N, and the crank $o'$ is connected by a rod $p$ with a disk P fixed to the front end of a short spindle passing horizontally through the cross bar $c$ and provided at its rear end with a milled head $p'$, as shown in Fig. 3 in connection with Figs. 1 and 2. The disk P is connected on opposite sides of its center by rods $q\,q$ with sleeves Q Q mounted upon the cross bar $c$ and adapted to be moved lengthwise thereon underneath handle bars $g\,g$ so as to hold them rigidly with the cross bar $c$ when they are disconnected from the front wheel. A spring $n'$ placed on the connecting rod $n$ between an ear on fork C and a shoulder on said rod, tends to move and hold the clutch formations on sprocket wheel $a$ in engagement with the corresponding clutch formations on the front hub $a'$. It also serves to hold the sleeves Q Q in or out of engagement with the handle bars $g\,g$ through its connections hereinbefore described with the disk P, the point of attachment of the rod $p$ with said disk being on opposite sides of the vertical center of said disk when it is turned in opposite directions to the limits of its movement.

By means of the foregoing devices the sprocket wheel $a$ is moved into or out of engagement with the front wheel hub, and the handles and handle bars are simultaneously unlocked or locked with the cross bar $c$ by simply turning the milled head $p'$ in the proper direction. The sleeves Q Q are guided and limited at the proper point in their movement by keys $q'\,q'$ secured in the cross bar $c$ and projecting at their ends into longitudinal slots in said sleeves.

Each of the wheels is provided with two separate tires $a^3$ to present a greater bearing surface upon the ground and to prevent them from sinking into sand or soft earth and thereby impeding their movement. The hubs, as shown in Figs. 2 and 3, are formed or provided at or near the ends with flanges $a^4\,a^4$ having single inturned notched rims and at or near the center with a flange $a^5$ having a double inturned notched rim overhanging both its sides, for the attachment of the spokes, which are formed with heads at their inner ends and are slipped laterally into the notches in said flanges and then drawn outwardly taut into place therein. The outer set of spokes of each rim are attached at their inner ends to the notched rims of the outer flanges $a^4\,a^4$, and the inner set of spokes of each rim are attached at their inner ends to the adjacent side of the notched rim of the center flange $a^5$, the heads on the inner ends of the spokes being drawn into and held in the internal annular recesses formed by said inturned flanges. The spokes fastened to the hubs in the manner above explained are not bent and are much stronger in consequence and less liable to break than when bent in or close to the hub as in the ordinary method of fastening them therein.

By the employment of the hand driving connections with the front wheel together with the pedal connections with the rear wheel, the machine may be geared up to run faster and a much greater speed attained than with the ordinary driving connections.

The operation of my improvements will be sufficiently understood by those familiar with this class of machines without further explanation. When the rider wishes to apply more force to the propulsion of the wheel, for the purpose of attaining greater speed, climbing hills or running on a heavy track, he unlocks the steering handles and bars L L, $l\,l$, and simultaneously throws the sprocket wheel $a$ into engagement with the hub $a'$ of the front wheel by turning the milled head $p'$ to the left, carrying the disk P, the sleeves Q Q, and the sprocket wheel $a$ into the positions in which they are shown in Fig. 2. The handles L L being now free to oscillate upon the cross bar $c$, serve not only to propel the front wheel but also to guide it through the cross bar $c$ and the front wheel fork C. When it is desired to propel the wheel in the ordinary manner by the foot pedals G G alone, the sprocket wheel $a$ is thrown out of engagement with the front wheel hub $a'$, and the sleeves Q Q are thrust outwardly underneath the handle bars $l\,l$, thereby locking them rigidly with the cross bar $c$. The handles L L now serve simply to guide the front wheel in the ordinary manner.

Various changes in the minor details of construction and arrangement of my improvements may be made within the intended scope of my invention.

I claim—

1. In a bicycle, the combination with the front wheel and fork, the rear wheel and oppositely set crank pedals connected therewith, of propelling and steering handles separately fulcrumed or pivoted to said fork and movable simultaneously in opposite directions, and driving connections embracing a clutch between said handles and the front wheel, substantially as and for the purposes set forth.

2. In a bicycle, the combination with the front wheel and fork, the rear wheel and oppositely set crank pedals connected therewith, of propelling and steering handles separately fulcrumed or pivoted to said fork and movable simultaneously in opposite directions, driving connections including a clutch connecting said handles with the front wheel, and a spring tending to hold the holes of said clutch in engagement, substantially as and for the purposes set forth.

3. In a bicycle, the combination with the front wheel and fork provided with a cross bar at its upper end, of propelling and steering handles independently fulcrumed or pivoted upon said cross bar and movable simultaneously in opposite directions, a crank shaft carried by the fork parallel with said cross bar and provided with oppositely set cranks which are connected with said handles, a sprocket wheel mounted loosely upon the front wheel hub or axle and connected by a chain belt with a sprocket wheel on said crank shaft, and a clutch arranged to engage said sprocket wheel with the front wheel hub, substantially as and for the purposes set forth.

4. In a bicycle, the combination with the front wheel and fork provided at its upper end with a cross bar, of handle bars pivotally connected with opposite ends of said cross-bar, and movable simultaneously in opposite directions a crank shaft with which said handle bars are connected, and driving connections between said crank shaft and the front wheel, substantially as and for the purposes set forth.

5. In a bicycle, the combination with the front wheel and fork provided with a cross bar at its upper end, of handle bars pivotally connected with said cross bar, and movable simultaneously in opposite directions a cross shaft carried by said fork and provided with oppositely set cranks which are connected with said handle bars, a sprocket wheel mounted upon said shaft and connected by a chain belt with a sprocket wheel on the front wheel hub, substantially as and for the purposes set forth.

6. In a bicycle, the combination with the front wheel, a sprocket wheel, means for connecting and disconnecting the same with said front wheel, of a front wheel fork provided at its upper end with a cross bar, handle bars pivotally connected with said cross bar, a crank shaft connected with said handle bars and provided with a sprocket wheel, which is connected by a chain belt with the sprocket wheel first mentioned, and means for locking and unlocking said handle bars with the cross bar on which they are mounted, substantially as and for the purposes set forth.

7. In a bicycle, the combination with the front wheel provided with a sprocket wheel loosely mounted upon its hub or axle, the front wheel fork provided with a cross bar at its upper end, handle bars pivotally connected with said cross bar transversely thereto, a crank shaft connected with said handle bars and provided with a sprocket wheel which is connected by a chain belt with said first mentioned sprocket wheel, and means for simultaneously locking or unlocking said handle bars with the cross bar on which they are mounted and for connecting or disconnecting the driven sprocket wheel with said front wheel, substantially as and for the purposes set forth.

8. In a bicycle, the combination with the front wheel and wheel fork, of vibrating steering handles connected with said fork, driving connections between said handles and said front wheel, a locking device for rigidly securing said handles to said fork, and means for simultaneously operating said locking device and throwing said driving connections into or out of gear with said front wheel, substantially as and for the purposes set forth.

9. In a bicycle, the combination with the front wheel and fork, which is provided at its upper end with a cross bar, of handle bars pivotally connected with said cross bar, driving connections between said handle bars and the front wheel, and sleeves mounted upon said cross bar and movable lengthwise thereof into and out of engagement with said handle bars, substantially as and for the purposes set forth.

10. In a bicycle, the combination with the front wheel and fork, which is provided at its upper end with a cross bar, of handle bars pivotally connected with said cross bar, a sprocket wheel loosely mounted upon the front wheel axle or hub and provided with clutch formations which are movable into and out of engagement with similar formations on the wheel hub, a forked bell crank lever connected with said sprocket wheel and fulcrumed to said fork, sleeves mounted upon said cross bar and movable lengthwise thereof into and out of engagement with said handle bars, an oscillatory disk carried by said cross bar and connected with said sleeves and with said forked bell crank lever, and driving connections between said handle bars and said sprocket wheel, substantially as and for the purposes set forth.

11. In a bicycle, the combination with the saddle bars and an upright of the frame, of an adjustable saddle support comprising a spindle to which the saddle is attached, a tube in which said spindle is inserted and loosely held, pivotally connected at or near its lower end with said upright and adjustably connected at or near its upper end with the saddle bars, substantially as and for the purposes set forth.

12. In a bicycle, the combination with the saddle and the frame comprising two saddle supporting bars and an upright, of a saddle support comprising a spindle with which the saddle is adjustably connected by clutch plates, a tube in which said spindle is loosely inserted and held from turning by a key, said tube having a pivotal connection at or near its lower end with said upright, and adjustably connected at or near its upper end by a cross bar with said saddle bars, and a telescoping coiled spring interposed between flanged plates fixed to the upper ends of said spindle and tubes, substantially as and for the purposes set forth.

13. In a bicycle, the combination with the saddle and the frame comprising an upright and two saddle bars, of an adjustable saddle support consisting of a spindle to which the saddle is secured, a tube in which said spindle is inserted, having a pivotal connection at or near its lower end with said upright and connected at or near its upper end by a cross bar with said saddle bars, and a spring interposed between said saddle and the upper end of said tube, said tube being vertically adjustable so as to raise and lower the saddle, substantially as and for the purposes set forth.

In testimony that I claim the foregoing as my own I affix my signature in presence of two witnesses.

FREDRICK W. HUENNEKENS.

Witnesses:
CHAS. L. GOSS,
JOHN H. HURLEY.